United States Patent
Hanada et al.

(10) Patent No.: US 10,227,004 B2
(45) Date of Patent: Mar. 12, 2019

(54) VEHICLE CONSTANT-SPEED TRAVEL CONTROL APPARATUS, VEHICLE CONSTANT-SPEED TRAVEL CONTROL METHOD, AND COMPUTER READABLE MEDIUM

(71) Applicant: MITSUBISHI ELECTRIC CORPORATION, Tokyo (JP)

(72) Inventors: Takehiko Hanada, Tokyo (JP); Mengxiong Wang, Tokyo (JP)

(73) Assignee: MITSUBISHI ELECTRIC CORPORATION, Tokyo (JP)

(*) Notice: Subject to any disclaimer, the term of this patent is extended or adjusted under 35 U.S.C. 154(b) by 8 days.

(21) Appl. No.: 15/562,393

(22) PCT Filed: Jul. 24, 2015

(86) PCT No.: PCT/JP2015/071094
§ 371 (c)(1),
(2) Date: Sep. 27, 2017

(87) PCT Pub. No.: WO2017/017725
PCT Pub. Date: Feb. 2, 2017

(65) Prior Publication Data
US 2018/0281594 A1    Oct. 4, 2018

(51) Int. Cl.
*B60K 31/04* (2006.01)
*B60W 30/16* (2012.01)
(Continued)

(52) U.S. Cl.
CPC ............ *B60K 31/047* (2013.01); *B60K 31/00* (2013.01); *B60K 31/0008* (2013.01);
(Continued)

(58) Field of Classification Search
CPC .... B60K 31/00; B60K 31/04; B60K 31/0008; B60K 31/0058; B60K 31/0066;
(Continued)

(56) References Cited

U.S. PATENT DOCUMENTS 6,044,321 A    3/2000  Nakamura et al.
6,076,034 A    6/2000  Satoh et al.
(Continued)

FOREIGN PATENT DOCUMENTS

JP    2571357 B2    1/1997
JP    9-323628 A    12/1997
(Continued)

*Primary Examiner* — Thomas G Black
*Assistant Examiner* — Sara J Lewandroski
(74) *Attorney, Agent, or Firm* — Birch, Stewart, Kolasch & Birch, LLP

(57) ABSTRACT

A number-of-operations information storage unit (113) stores number-of-operations information in which a plurality of conditions of the vehicle is defined and number of acceleration operations and number of deceleration operations performed by a vehicle are described for each condition defined. A correction speed specifying unit (109) detects a current condition of the vehicle, when the vehicle travels at a constant speed, extracts number of acceleration operations and number of deceleration operations described for a condition corresponding to the detected current condition of the vehicle from the number-of-operations information, compares the extracted number of acceleration operations with the extracted number of deceleration operations, specifies a correction speed higher than a set speed for a constant-speed travel if the number of acceleration operations is larger than the number of deceleration operations, and specifies a correction speed lower than the set speed if the number of deceleration operations is larger than the number of acceleration operations. A constant-speed travel control
(Continued)

unit (108) makes the vehicle travel at a constant speed based on the correction speed specified by the correction speed specifying unit (109).

13 Claims, 10 Drawing Sheets

(51) Int. Cl.
*B60W 50/10* (2012.01)
*B60K 31/00* (2006.01)
*B60K 31/02* (2006.01)
*B60W 30/14* (2006.01)
*B60W 10/02* (2006.01)
*B60W 10/06* (2006.01)
*B60W 10/10* (2012.01)
*B60W 10/18* (2012.01)
*F02D 41/04* (2006.01)

(52) U.S. Cl.
CPC ............ *B60K 31/02* (2013.01); *B60W 10/02* (2013.01); *B60W 10/06* (2013.01); *B60W 10/10* (2013.01); *B60W 10/18* (2013.01); *B60W 30/14* (2013.01); *B60W 30/143* (2013.01); *B60W 30/162* (2013.01); *B60W 50/10* (2013.01); *F02D 41/045* (2013.01); B60W 2520/10 (2013.01); B60W 2540/10 (2013.01); B60W 2540/12 (2013.01); B60W 2540/14 (2013.01); B60W 2550/402 (2013.01); B60W 2720/10 (2013.01); B60W 2720/106 (2013.01); B60W 2750/308 (2013.01); *F02D 2200/101* (2013.01); *F02D 2200/501* (2013.01); *F02D 2200/602* (2013.01); *F02D 2200/701* (2013.01); *F02D 2250/18* (2013.01)

(58) Field of Classification Search
CPC ............ B60K 31/0075; B60K 31/0083; B60K 2031/0016; B60K 2031/0025; B60K 2031/0033; B60K 2031/0041; B60K 2031/005; B60K 2310/00; B60K 2310/20; B60K 2310/22; B60K 2310/24; B60K 2310/244; B60W 30/14; B60W 30/143; B60W 30/146; B60W 2050/0062; B60W 2050/0075; B60W 2050/0089; B60W 2530/14
See application file for complete search history.

(56) References Cited

U.S. PATENT DOCUMENTS

| | | | |
|---|---|---|---|
| 2006/0015241 A1* | 1/2006 | Shima | B60K 31/0008 701/96 |
| 2010/0138100 A1* | 6/2010 | Kim | B60W 30/14 701/31.4 |
| 2011/0160978 A1* | 6/2011 | Yuzawa | B60W 10/06 701/93 |
| 2018/0052458 A1* | 2/2018 | Tsuji | B60W 50/14 |
| 2018/0074497 A1* | 3/2018 | Tsuji | G06K 9/00288 |
| 2018/0105186 A1* | 4/2018 | Motomura | B60W 50/14 |

FOREIGN PATENT DOCUMENTS

| | | |
|---|---|---|
| JP | 11-20511 A | 1/1999 |
| JP | 11-124019 A | 5/1999 |
| JP | 2003-39978 A | 2/2003 |
| JP | 2003-276472 A | 9/2003 |
| JP | 3521691 B2 | 4/2004 |
| JP | 3646492 B2 | 5/2005 |
| JP | 2006-298203 A | 11/2006 |
| JP | 2010-83402 A | 4/2010 |
| JP | 2010-97455 A | 4/2010 |
| JP | 2011-184013 A | 9/2011 |
| JP | 5056707 B2 | 10/2012 |
| JP | 5256989 B2 | 8/2013 |

* cited by examiner

Fig. 2

| CONDITION | | | NUMBER OF ACCELERATION OPERATIONS | NUMBER OF DECELERATION OPERATIONS |
|---|---|---|---|---|
| VEHICLE POSITION (LATITUDE, LONGITUDE) | VEHICLE SPEED (km/h) | HEADLIGHTS | | |
| 35.348445, 139.488817 | 30-39 | ON | 4 | 19 |
| 35.348445, 139.488817 | 30-39 | OFF | 13 | 3 |
| 35.348445, 139.488817 | 40-49 | ON | 6 | 21 |
| 35.348445, 139.488817 | 40-49 | OFF | 17 | 6 |
| 35.338714, 139.476543 | 30-39 | ON | 5 | 17 |
| 35.338714, 139.476543 | 30-39 | OFF | 22 | 7 |
| 35.338714, 139.476543 | 40-49 | ON | 7 | 31 |
| 35.338714, 139.476543 | 40-49 | OFF | 26 | 6 |

Fig. 3

| CONDITION (COMBINATION OF SENSOR VALUES) | | | NUMBER OF ACCELERATION OPERATIONS | NUMBER OF DECELERATION OPERATIONS |
|---|---|---|---|---|
| VEHICLE POSITION (LATITUDE, LONGITUDE) | VEHICLE SPEED (km/h) | ENGINE SPEED (rpm) | | |
| 35.348445, 139.488817 | 30-39 | 2000-2999 | 6 | 8 |
| 35.348445, 139.488817 | 30-39 | 3000-3999 | 7 | 8 |
| 35.348445, 139.488817 | 30-39 | 4000-4999 | 4 | 6 |
| 35.348445, 139.488817 | 40-49 | 2000-2999 | 6 | 7 |
| 35.348445, 139.488817 | 40-49 | 3000-3999 | 9 | 8 |
| 35.348445, 139.488817 | 40-49 | 4000-4999 | 8 | 10 |
| 35.338714, 139.476543 | 30-39 | 2000-2999 | 8 | 9 |
| 35.338714, 139.476543 | 30-39 | 3000-3999 | 9 | 10 |
| 35.338714, 139.476543 | 30-39 | 4000-4999 | 11 | 8 |
| 35.338714, 139.476543 | 40-49 | 2000-2999 | 10 | 13 |
| 35.338714, 139.476543 | 40-49 | 3000-3999 | 23 | 13 |
| 35.338714, 139.476543 | 40-49 | 4000-4999 | 10 | 11 |

Fig. 4

| CONDITION (COMBINATION OF SENSOR VALUES) | | | | NUMBER OF ACCELERATION OPERATIONS | NUMBER OF DECELERATION OPERATIONS |
|---|---|---|---|---|---|
| VEHICLE POSITION (LATITUDE, LONGITUDE) | VEHICLE SPEED (km/h) | ENGINE SPEED (rpm) | HEADLIGHTS | | |
| 35.348445, 139.488817 | 30-39 | 2000-2999 | ON | 2 | 6 |
| 35.348445, 139.488817 | 30-39 | 2000-2999 | OFF | 4 | 2 |
| 35.348445, 139.488817 | 30-39 | 3000-3999 | ON | 2 | 8 |
| 35.348445, 139.488817 | 30-39 | 3000-3999 | OFF | 5 | 0 |
| 35.348445, 139.488817 | 30-39 | 4000-4999 | ON | 0 | 5 |
| 35.348445, 139.488817 | 30-39 | 4000-4999 | OFF | 4 | 1 |
| 35.348445, 139.488817 | 40-49 | 2000-2999 | ON | 2 | 6 |
| 35.348445, 139.488817 | 40-49 | 2000-2999 | OFF | 4 | 1 |
| 35.348445, 139.488817 | 40-49 | 3000-3999 | ON | 2 | 6 |
| 35.348445, 139.488817 | 40-49 | 3000-3999 | OFF | 7 | 2 |
| 35.348445, 139.488817 | 40-49 | 4000-4999 | ON | 2 | 7 |
| 35.348445, 139.488817 | 40-49 | 4000-4999 | OFF | 6 | 3 |
| 35.338714, 139.476543 | 30-39 | 2000-2999 | ON | 3 | 7 |
| 35.338714, 139.476543 | 30-39 | 2000-2999 | OFF | 5 | 2 |
| 35.338714, 139.476543 | 30-39 | 3000-3999 | ON | 1 | 7 |
| 35.338714, 139.476543 | 30-39 | 3000-3999 | OFF | 8 | 3 |
| 35.338714, 139.476543 | 30-39 | 4000-4999 | ON | 2 | 6 |
| 35.338714, 139.476543 | 30-39 | 4000-4999 | OFF | 9 | 2 |
| 35.338714, 139.476543 | 40-49 | 2000-2999 | ON | 1 | 10 |
| 35.338714, 139.476543 | 40-49 | 2000-2999 | OFF | 9 | 3 |
| 35.338714, 139.476543 | 40-49 | 3000-3999 | ON | 3 | 11 |
| 35.338714, 139.476543 | 40-49 | 3000-3999 | OFF | 10 | 2 |
| 35.338714, 139.476543 | 40-49 | 4000-4999 | ON | 3 | 10 |
| 35.338714, 139.476543 | 40-49 | 4000-4999 | OFF | 7 | 1 |

VEHICLE CONSTANT-SPEED TRAVEL CONTROL APPARATUS, VEHICLE CONSTANT-SPEED TRAVEL CONTROL METHOD, AND COMPUTER READABLE MEDIUM

TECHNICAL FIELD

The present invention relates to constant-speed travel of vehicles.

BACKGROUND ART

There have been motor vehicles having functions called cruise control capable of continuing traveling while maintaining a preset steady speed without drivers pressing accelerator pedals.

Furthermore, there has also been cruise control capable of detecting proximity to a vehicle ahead and controlling the speed to keep a proper distance between vehicles and avoid collision.

Such functions of cruise control are typically turned off when a driver presses a brake pedal, an accelerator pedal, or a cancel button.

In addition, there have also been methods for adjusting a set speed for cruise control by a driver pressing a brake pedal or an accelerator pedal (Patent Literature 1, for example).

CITATION LIST

Patent Literature

Patent Literature 1: JP 2571357 B2

SUMMARY OF INVENTION

Technical Problem

When a vehicle travelling at a constant speed under cruise control travels near a parked vehicle or near a pedestrian, the vehicle needs to decelerate.

In addition, when a vehicle travelling at a constant speed under cruise control enters a zone with a higher speed limit or when the vehicle decelerates owing to an external factor such as a sag ("sag" means a lowest point between descending and ascending slopes) on a road, the vehicle needs to accelerate.

In such cases where deceleration or acceleration is required, a driver needs to turn off the cruise control by actively pressing a brake pedal or an accelerator pedal or by adjusting a set speed.

The cruise control of Patent Literature 1 aims at reducing drivers' workload.

Thus, the technology of Patent Literature 1 has a problem in that the cruise control is not turned off or the set speed is not adjusted without the driver's active operation even in a case where deceleration or acceleration is required as explained above.

A major object of the present invention is to solve such a problem as described above. The present invention mainly aims to correct a traveling speed of a vehicle without the driver's active operation, when the vehicle travels at a constant speed under cruise control.

Solution to Problem

A vehicle constant-speed travel control apparatus includes:

a number-of-operations information storage unit to store number-of-operations information in which a plurality of conditions of the vehicle is defined and number of acceleration operations and number of deceleration operations performed by the vehicle are described for each condition defined;

a correction speed specifying unit to detect a current condition of the vehicle, when the vehicle travels at a constant speed, extract number of acceleration operations and number of deceleration operations described for a condition corresponding to the detected current condition of the vehicle from the number-of-operations information, compare the extracted number of acceleration operations with the extracted number of deceleration operations, specify a correction speed higher than a set speed for a constant-speed travel if the number of acceleration operations is larger than the number of deceleration operations, and specify a correction speed lower than the set speed if the number of deceleration operations is larger than the number of acceleration operations; and a constant-speed travel control unit to make the vehicle travel at a constant speed based on the correction speed specified by the correction speed specifying unit.

Advantageous Effects of Invention

According to the present invention, when a vehicle travels at a constant speed, the traveling speed of the vehicle can be corrected without active operation of the driver, on the basis of estimation on whether the vehicle needs to accelerate or decelerate.

BRIEF DESCRIPTION OF DRAWINGS

FIG. 2 is a table illustrating an example of number-of-operations information according to the first embodiment.

FIG. 3 is a table illustrating an example of candidate information according to the first embodiment.

FIG. 4 is a table illustrating an example of candidate information according to the first embodiment.

DESCRIPTION OF EMBODIMENTS

First Embodiment

*Description of Configuration*

Figure 1:
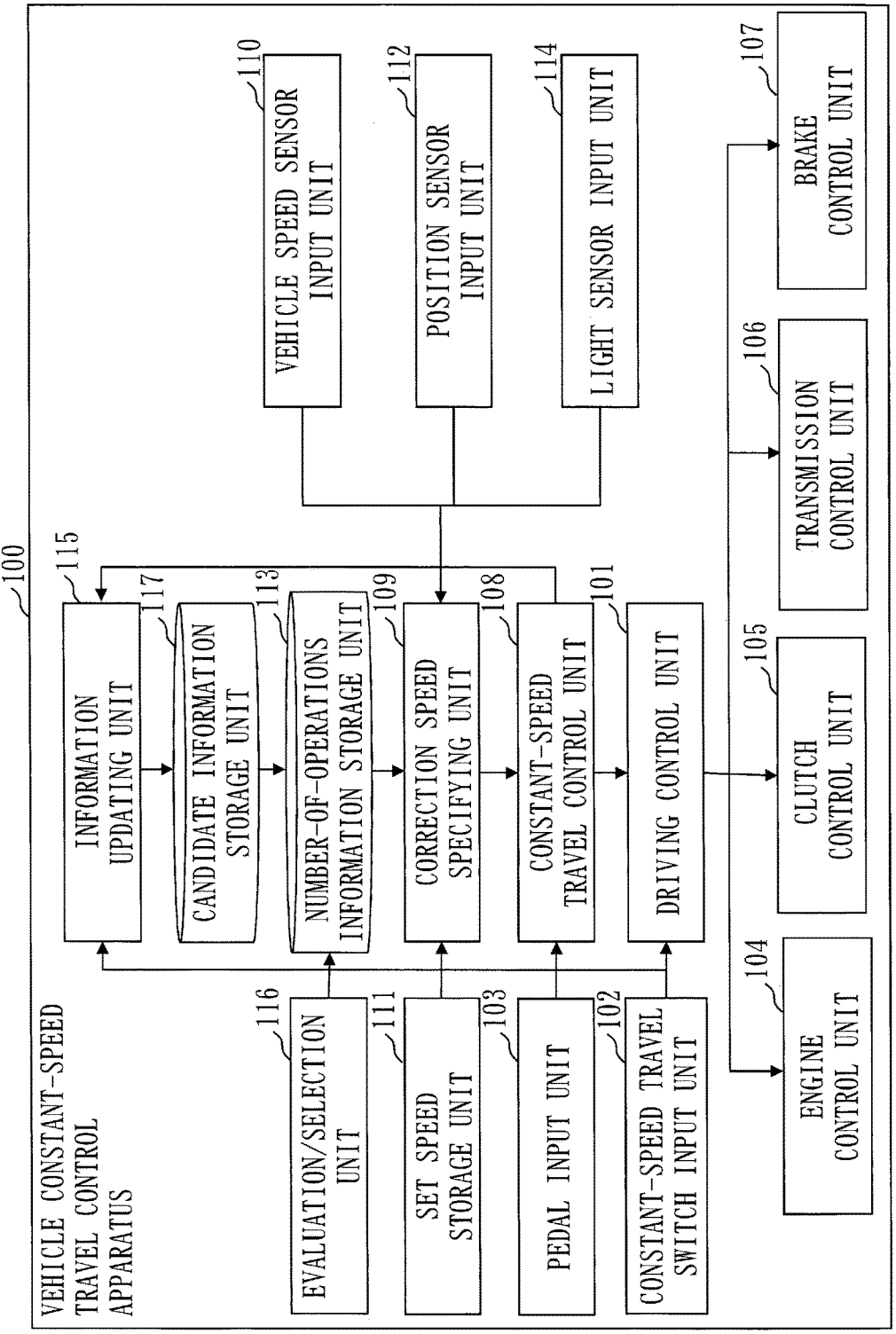
FIG. 1 is a diagram illustrating an example functional configuration of a vehicle constant-speed travel control apparatus according to a first embodiment.

FIG. 1 illustrates an example functional configuration of a vehicle constant-speed travel control apparatus 100 according to the present embodiment.

The vehicle constant-speed travel control apparatus 100 is mounted on a vehicle, which is not illustrated in FIG. 1, and controls traveling of the vehicle.

A driving control unit 101 performs basic control relating to traveling of the vehicle.

Specifically, while constant-speed travel is disabled by a constant-speed travel switch input unit 102, the driving control unit 101 performs control on acceleration and deceleration of the vehicle on the basis of an input from an accelerator pedal, a brake pedal, or a clutch pedal acquired by a pedal input unit 103.

In addition, while the constant-speed travel is enabled and an input indicating that the accelerator pedal or the brake pedal is being pressed is acquired by the pedal input unit 103, the driving control unit 101 performs control on acceleration and deceleration of the vehicle on the basis of an input from the accelerator pedal, the brake pedal, or the clutch pedal acquired by a pedal input unit 103.

The driving control unit 101 performs the control on acceleration and deceleration of the vehicle by controlling an engine control unit 104, a clutch control unit 105, a transmission control unit 106, and a brake control unit 107.

In addition, while the constant-speed travel is enabled by the constant-speed travel switch input unit 102 and an input indicating that the accelerator pedal and the brake pedal are not being pressed is acquired by the pedal input unit 103, the driving control unit 101 is subjected to speed control performed by a constant-speed travel control unit 108.

The pedal input unit 103 is connected to the accelerator pedal, the brake pedal, and the clutch pedal located in the vehicle.

In addition, the pedal input unit 103 detects that the pedals are pressed by the driver of the vehicle, and acquires the amounts by which the pedals are pressed.

Note that the clutch pedal and the clutch control unit 105 are not present in a vehicle in which no clutch is mounted.

The constant-speed travel control unit 108 operates only while the constant-speed travel is enabled by the constant-speed travel switch input unit 102.

The constant-speed travel control unit 108 controls the traveling speed during the constant-speed travel.

Specifically, the constant-speed travel control unit 108 controls the traveling speed during the constant-speed travel on the basis of a correction speed informed of by a correction speed specifying unit 109, which will be described below, and a current traveling speed acquired from a vehicle speed sensor input unit 110.

The constant-speed travel control unit 108 controls the driving control unit 101 so that the vehicle decelerates if the current traveling speed is higher than the correction speed and that the vehicle accelerates if the current traveling speed is lower than the correction speed.

The correction speed specifying unit 109 specifies a correction speed, and informs the constant-speed travel control unit 108 of the specified correction speed.

While the vehicle is cruising at a constant speed, the correction speed specifying unit 109 obtains a correction speed that is a correction of a set speed for the constant-speed travel stored in a set speed storage unit 111, and informs the constant-speed travel control unit 108 of the correction speed.

More specifically, while the constant-speed travel is enabled by the constant-speed travel switch input unit 102 and an input indicating that the accelerator pedal and the brake pedal are not being pressed is acquired by the pedal input unit 103, the correction speed specifying unit 109 detects the current condition of the vehicle.

The correction speed specifying unit 109 then extracts the number of acceleration operations and the number of deceleration operations described for a condition corresponding to the detected current condition of the vehicle, from number-of-operations information.

The number-of-operations information is stored in a number-of-operations information storage unit 113, which will be described below.

The correction speed specifying unit 109 then compares the extracted number of acceleration operations with the extracted number of deceleration operations.

If the number of acceleration operations is larger than the number of deceleration operations, the correction speed specifying unit 109 specifies a correction speed higher than the set speed for the constant-speed travel.

If the number of deceleration operations is larger than the number of acceleration operations, the correction speed specifying unit 109 specifies a correction speed lower than the set speed for the constant-speed travel.

If the number of acceleration operations is equal to the number of deceleration operations, the correction speed specifying unit 109 does not specify a correction speed.

If the number of acceleration operations and the number of deceleration operations associated with the current condition of the vehicle cannot be extracted from the number-of-operations information, the correction speed specifying unit 109 does not specify a correction speed.

The vehicle speed sensor input unit 110 acquires a current traveling speed of the vehicle.

The vehicle speed sensor input unit 110 counts vehicle speed signal pulses generated based on a detection of axle rotation of the vehicle, and obtains the traveling speed from a ratio of a constant of counts generated per one turn of the axle to the counts obtained per unit time, a tire diameter, and the circular constant.

A position sensor input unit 112 acquires a current position of the vehicle on the earth.

The position sensor input unit 112 uses a GPS (Global Positioning System), for example, to acquire the latitude and the longitude of the vehicle.

A light sensor input unit 114 determines whether headlights of the vehicle are ON or OFF.

Although not illustrated in FIG. 1, the vehicle has mounted thereon sensors other than the vehicle speed sensor input unit 110, the position sensor input unit 112, and the light sensor input unit 114.

For example, a sensor to measure the engine speed, a sensor to determine the current gear ratio of the transmission, a sensor to measure the distance from a vehicle ahead, and a sensor to measure the illumination outside the vehicle are mounted on the vehicle.

In addition, a weight sensor may be attached under the front passenger seat to determine whether or not a person is on the front passenger seat.

The set speed storage unit 111 stores a set speed for the constant-speed travel.

The set speed storage unit 111 also informs the correction speed specifying unit 109 of the stored set speed.

The set speed storage unit 111 may store a speed manually provided by the driver as the set speed.

Alternatively, the set speed storage unit 111 may store a traveling speed at a time when the constant-speed travel is enabled by the constant-speed travel switch input unit 102, that is a value calculated by the vehicle speed sensor input unit 110 at the time when the constant-speed travel is enabled, as the set speed.

The number-of-operations information storage unit 113 stores the number-of-operations information.

The number-of-operations information is information in which a plurality of conditions of the vehicle is defined and the number of acceleration operations and the number of deceleration operations performed by the vehicle are described for each of the plurality of conditions defined.

FIG. 2 illustrates an example of the number-of-operations information.

The number-of-operations information includes a plurality of measurement items.

Thus, a condition of the vehicle is defined by a combination of measured values (also referred to as sensor values) of the respective measurement items.

The measured values of the respective measurement items are values obtained by measurement during normal traveling of the vehicle.

The normal traveling refers to a traveling condition in which the constant-speed travel is not applied.

In the example of FIG. 2, the measurement items include "vehicle position," "vehicle speed," and "headlights."

Thus, a condition of the vehicle is defined by a combination of a measured value of the "vehicle position," a measured value of the "vehicle speed," and a measured value of the "headlights."

The first row in FIG. 2 shows a condition in which the vehicle travels: at a position of "latitude: 35.348445, longitude: 139.488817" with headlights "ON" at a vehicle speed in a range of "30-39" km/h.

The number-of-operations information also describes the number of acceleration operations and the number of deceleration operations performed by the vehicle in each of the combinations of the measured values of the respective measurement items.

The number of acceleration operations refers to the number of times the driver pressed the accelerator pedal.

The number of deceleration operations refers to the number of times the driver pressed the brake pedal.

The first row in FIG. 2 shows that, under the condition in which the vehicle travels at a position of "latitude: 35.348445, longitude: 139.488817" with headlights "ON" at a vehicle speed in a range of "30-39" km/h, the driver pressed the accelerator pedal four times in the past and pressed the brake pedals 19 times in the past.

If the current condition of the vehicle detected by the correction speed specifying unit 109 is a vehicle position of "latitude: 35.348445, longitude: 139.488817" with headlights "ON" at a vehicle speed in a range of "30-39" km/h, the correction speed specifying unit 109 extracts the number of acceleration operations "4" and the number of deceleration operations "19" on the first row in FIG. 2, which corresponds to this combination.

Note that the measurement items (vehicle position, vehicle speed, and headlights) of the number-of-operations information in FIG. 2 correspond to values measured by the vehicle speed sensor input unit 110, the position sensor input unit 112, and the light sensor input unit 114.

Other types of sensors, however, are mounted on the vehicle, and the number-of-operations information may include measurement items of the other types of sensors.

For example, the number-of-operations information may include measurement items of the sensor to measure the engine speed, the sensor to determine the current gear ratio of the transmission, the sensor to measure the distance from a vehicle ahead, and the sensor to measure the illumination outside the vehicle.

In addition, the number-of-operations information may also include whether or not a smart phone is carried in the vehicle, the type of the road (expressway, national road, prefectural road, city road, etc.) on which the vehicle is traveling, and the like as the measurement items.

Whether or not a smart phone is carried in the vehicle can be determined by measurement of whether or not connection from the smart phone to a WiFi access point in the vehicle is present.

The type of the road on which the vehicle is traveling can be identified by analyzing map data of a car navigation system on the basis of the current position of the vehicle.

The measurement items included in the number-of-operations information are preferably items in cause and effect relationship with the driver's pedal operation. As will be described below, however, since measurement items unnecessary for selection of candidate information are deleted, a measurement item and a pedal operation may not be in cause and effect relationship.

A candidate information storage unit 117 stores a plurality of pieces of candidate information.

The candidate information is the number-of-operations information before being selected by an evaluation/selection unit 116, which will be described below.

The difference between the number-of-operations information in the number-of-operations information storage unit 113 and the candidate information in the candidate information storage unit 117 lies in that the former is the number-of-operations information selected by the evaluation/selection unit 116 while the latter is the number-of-operations information before being selected by the evaluation/selection unit 116.

The candidate information in the candidate information storage unit 117 is, however, in common with the number-of-operations information in the number-of-operations information storage unit 113 in that the candidate information includes a plurality of measurement items, defines conditions of the vehicle by combinations of measured values of the respective measurement items, and describes the number of acceleration operations and the number of deceleration operations performed by the vehicle in each of the defined conditions.

The candidate information is information illustrated in FIGS. 3 and 4, for example.

In the candidate information in FIG. 3, the measurement items are "vehicle position," "vehicle speed," and "engine speed."

In the candidate information in FIG. 4, the measurement items are "vehicle position," "vehicle speed," "engine speed," and "headlights."

Thus, the candidate information in FIG. 3 includes n (n is an integer of 2 or larger) measurement items (vehicle position, vehicle speed, and engine speed).

The candidate information in FIG. 4 includes the n measurement items (vehicle position, vehicle speed, and engine speed) in common with the candidate information in FIG. 3 and also includes m (m is an integer of 1 or larger)

measurement item (headlights) that is not in common with the candidate information in FIG. 3.

The candidate information in FIG. 3 corresponds to an example of first number-of-operations information, and the candidate information in FIG. 4 corresponds to an example of second number-of-operations information.

When the pedal input unit 103 detected a pedal operation during normal traveling of the vehicle, an information updating unit 115 reflects the combination of measured values acquired from the vehicle speed sensor input unit 110, the position sensor input unit 112, and the light sensor input unit 114 and the type of the pedal operation, in the candidate information which will be described below.

Thus, when either an acceleration operation or a deceleration operation is detected during normal traveling, the information updating unit 115 acquires current measured values of the respective measurement items included in the candidate information.

In a case where the candidate information in FIG. 3 and the candidate information in FIG. 4 are stored in the candidate information storage unit 117, the information updating unit 115 acquires the current measured values of the "vehicle position," the "vehicle speed," the "engine speed," and the "headlights" from the vehicle speed sensor input unit 110, the position sensor input unit 112, the light sensor input unit 114 and an engine speed sensor (not illustrated in FIG. 1).

The information updating unit 115 then updates the number of times of the detected operation out of the number of acceleration operations and the number of deceleration operations described in association with the combination of the measured values corresponding to the combination of the acquired current measured values in each of the pieces of candidate information.

Assume that an operation of the brake pedal is detected during normal traveling, and that, at this point, the "vehicle position" is "latitude: 35.348445, longitude: 139.488817," the "vehicle speed" is in the range of "30-39" km/h, the "engine speed" is in a range of "2000-2999" rpm, and the headlights are "ON."

In this case, the information updating unit 115 increments the number of deceleration operations on the first row of the candidate information in FIG. 3 and on the first row of the candidate information in FIG. 4 by one.

If there is no row corresponding to the candidate information, the information updating unit 115 adds a row for the combination of the detected measured values, and sets "1" to the number of acceleration operations or the number of deceleration operations on the added row.

The evaluation/selection unit 116 evaluates the pieces of candidate information, and selects any one piece of candidate information from the pieces of candidate information on the basis of the evaluation result.

The number-of-operations information storage unit 113 stores the candidate information selected by the evaluation/selection unit 116 as number-of-operations information.

The evaluation/selection unit 116 edits the selected candidate information to generate new candidate information.

The evaluation/selection unit 116 then evaluates the selected candidate information and the new candidate information, and selects either candidate information on the basis of the evaluation result.

In this manner, the evaluation/selection unit 116 repeats selection of candidate information and generation of new candidate information based on the selected candidate information, to select candidate information that meets the driving tendency.

The evaluation/selection unit 116 corresponds to an example of an evaluation unit and a selection unit.

The evaluation by the evaluation/selection unit 116 is performed as follows.

The evaluation/selection unit 116 gives an evaluation score to the candidate information in which the number of operations after the update by the information updating unit 115 about an operation detected out of the acceleration operations and the deceleration operations is larger than the number of operations about the other operation, in the number-of-operations information.

For example, assume that an operation (deceleration operation) of the brake pedal is detected during normal traveling, and that, at this point, the "vehicle position" is "latitude: 35.348445, longitude: 139.488817," the "vehicle speed" is in the range of "30-39" km/h, the "engine speed" is in a range of "2000-2999" rpm, and the headlights are "ON."

In this case, the information updating unit 115 extracts the first row of the candidate information in FIG. 3 and the first row of the candidate information in FIG. 4, and increments the respective numbers of deceleration operations by one.

If the number of deceleration operations on the first row of the candidate information in FIG. 3 after the update is larger than the number of acceleration operations, the evaluation/selection unit 116 gives the evaluation score to the candidate information in FIG. 3.

If the number of deceleration operations on the first row of the candidate information in FIG. 4 after the update is larger than the number of acceleration operations, the evaluation/selection unit 116 gives the evaluation score to the candidate information in FIG. 4.

If the difference in total value of the evaluation score between the pieces of candidate information has exceeded a threshold, the evaluation/selection unit 116 selects the candidate information with the larger total value of the evaluation score.

In addition, the evaluation/selection unit 116 deletes a part of measurement items included in the candidate information selected to generate new number-of-operations information.

Assume here that the evaluation/selection unit 116 selects the candidate information in FIG. 4.

The evaluation/selection unit 116 registers "headlights," which is included in the candidate information in FIG. 4 but is not included in the candidate information in FIG. 3, as a measurement item that is prohibited to be deleted.

Thus, the measurement item "headlights" will no longer be deleted when new candidate information is generated.

The evaluation/selection unit 116 also deletes each of "vehicle position," "vehicle speed," and "engine speed" from the candidate information in FIG. 4 to generate new pieces of candidate information.

Specifically, the evaluation/selection unit 116 newly generates candidate information constituted by the measurement items "vehicle speed," "engine speed," and "headlights," candidate information constituted by the measurement items "vehicle position," "engine speed," and "headlights," and candidate information constituted by the measurement items "vehicle position," "vehicle speed," and "headlights."

The evaluation/selection unit 116 then performs the aforementioned evaluation on the candidate information in FIG. 4 and the three newly generated pieces of candidate information, newly selects any of the four pieces of candidate information, and repeats the same process on the selected candidate information.

On the other hand, when the evaluation/selection unit 116 selects the candidate information in FIG. 3, the evaluation/selection unit 116 deletes each of "vehicle position," "vehicle speed," and "engine speed" from the candidate information in FIG. 3 to generate new pieces of candidate information.

Specifically, the evaluation/selection unit 116 newly generates candidate information constituted by the measurement items "vehicle speed" and "engine speed," candidate information constituted by the measurement items "vehicle position" and "engine speed," and candidate information constituted by the measurement items "vehicle position" and "vehicle speed."

The evaluation/selection unit 116 then performs the aforementioned evaluation on the candidate information in FIG. 3 and the three newly generated pieces of candidate information, newly selects any of the four pieces of candidate information, and repeats the same process on the selected candidate information.

*Description of Operation*

Figure 5:
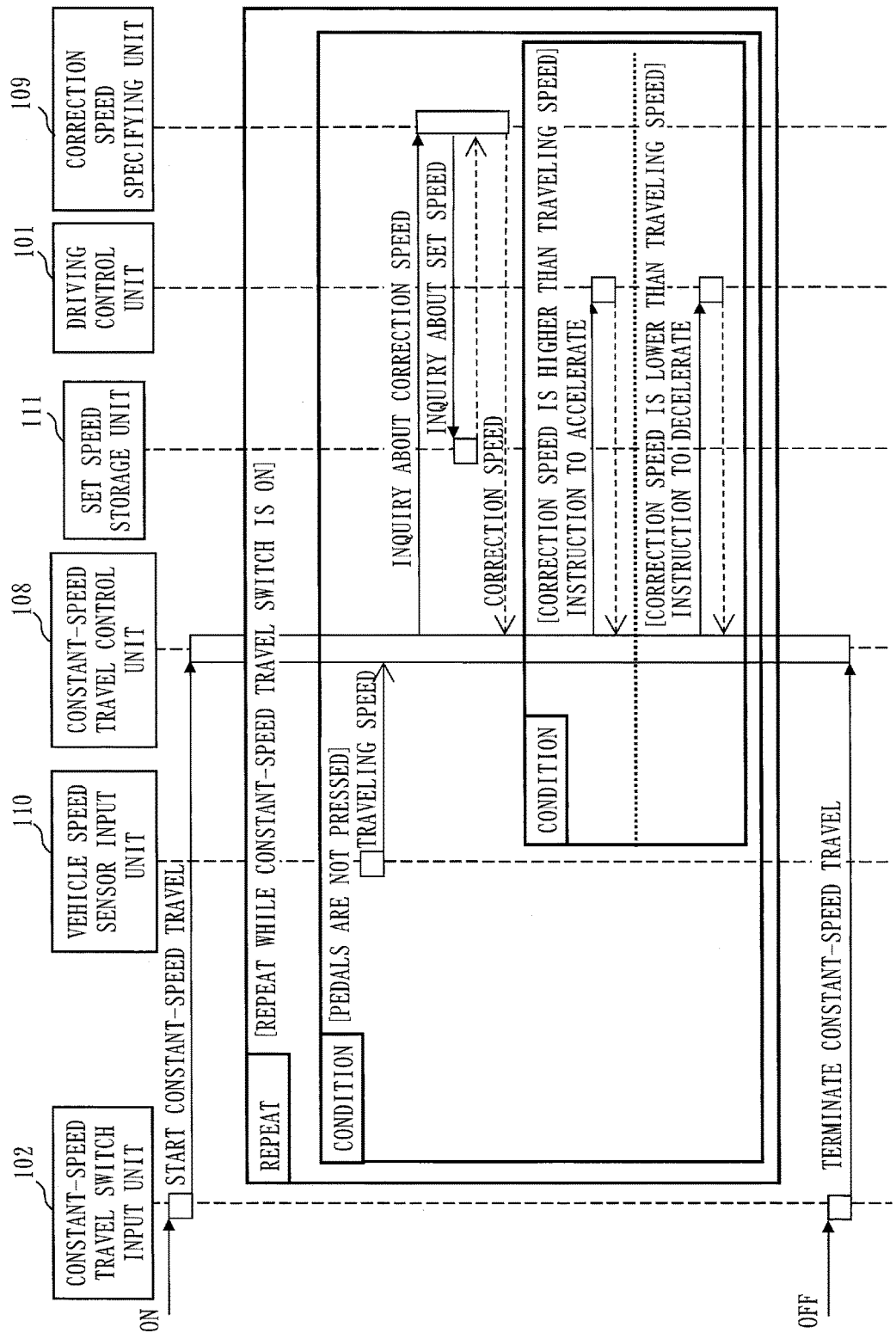
FIG. 5 is a sequence diagram illustrating example operations of the vehicle constant-speed travel control apparatus during constant-speed travel according to the first embodiment.

Next, example operations of the vehicle constant-speed travel control apparatus 100 according to the present embodiment during the constant-speed travel will be explained with reference to FIG. 5.

Note that procedures to be explained below correspond to an example of a vehicle constant-speed travel control method, and a vehicle constant-speed travel control program.

If the accelerator pedal and the brake pedal are not pressed during the constant-speed travel, the correction speed specifying unit 109 acquires measured values from the vehicle speed sensor input unit 110, the position sensor input unit 112, the light sensor input unit 114, and the like to detect the current condition of the vehicle.

The correction speed specifying unit 109 then extracts the number of acceleration operations and the number of deceleration operations described for a condition corresponding to the detected current condition of the vehicle from number-of-operations information.

The correction speed specifying unit 109 then compares the extracted number of acceleration operations with the extracted number of deceleration operations, and specifies a correction speed (correction speed specification process).

If the number of acceleration operations is larger than the number of deceleration operations, the correction speed specifying unit 109 specifies a correction speed higher than the set speed for the constant-speed travel.

If the number of deceleration operations is larger than the number of acceleration operations, the correction speed specifying unit 109 specifies a correction speed lower than the set speed for the constant-speed travel.

Note that the set speed for the constant-speed travel is informed of by the set speed storage unit 111 to the correction speed specifying unit 109.

When the correction speed specifying unit 109 is inquired about the correction speed by constant-speed travel control unit 108, the correction speed specifying unit 109 informs the constant-speed travel control unit 108 of the specified correction speed.

The constant-speed travel control unit 108 acquires the current traveling speed from the vehicle speed sensor input unit 110.

If the correction speed informed of by the correction speed specifying unit 109 is higher than the current traveling speed, the constant-speed travel control unit 108 instructs the driving control unit 101 to accelerate to the correction speed.

If the correction speed informed of by the correction speed specifying unit 109 is lower than the current traveling speed, the constant-speed travel control unit 108 instructs the driving control unit 101 to decelerate to the correction speed.

The driving control unit 101 accelerates or decelerates in accordance with the instruction from the constant-speed travel control unit 108, and informs the constant-speed travel control unit 108 that the acceleration or deceleration is completed.

As a result, the vehicle can perform the constant-speed travel at the correction speed (constant-speed travel control process).

Note that the correction speed specifying unit 109 repeats the above processes while the vehicle is cruising at a constant speed.

Next, example operations of the correction speed specifying unit 109 will be explained with reference to FIG. 6.

First, the correction speed specifying unit 109 determines whether or not the vehicle is currently cruising at a constant speed (S101).

After the correction speed specifying unit 109 receives from the constant-speed travel switch input unit 102 a notification indicating that the constant-speed travel is enabled and until the correction speed specifying unit 109 receives from the constant-speed travel switch input unit 102 a notification indicating that the constant-speed travel is disabled, the correction speed specifying unit 109 determines that the vehicle is travelling at a constant speed.

Before the correction speed specifying unit 109 receives from the constant-speed travel switch input unit 102 a notification indicating that the constant-speed travel is enabled and after the correction speed specifying unit 109 receives from the constant-speed travel switch input unit 102 a notification indicating that the constant-speed travel is disabled, the correction speed specifying unit 109 determines that the vehicle is traveling normally.

If the vehicle is traveling normally (NO in S101), the correction speed specifying unit 109 repeats the process of S101.

If the vehicle is travelling at a constant speed (YES in S101), the correction speed specifying unit 109 determines whether or not a pedal operation is performed by the driver (S102).

If the correction speed specifying unit 109 receives from the pedal input unit 103 a notification indicating that the accelerator pedal or the brake pedal is pressed, the correction speed specifying unit 109 determines that a pedal operation is performed.

If a pedal operation is performed by the driver (YES in S102), the correction speed specifying unit 109 returns the process to S101.

If no pedal operation is performed by the driver (NO in S102), the correction speed specifying unit 109 detects the current condition of the vehicle (S103).

Specifically, the correction speed specifying unit 109 receives measured values from the vehicle speed sensor input unit 110, the position sensor input unit 112, the light sensor input unit 114, and the like, and determines the current condition of the vehicle.

The correction speed specifying unit 109 then searches the number-of-operations information for the number of acceleration operations and the number of deceleration operations associated with the current condition (S104).

If the condition of the vehicle detected by the correction speed specifying unit 109 in S103 is at a vehicle position of "latitude: 35.348445, longitude: 139.488817" at a vehicle speed in the range of "30-39" km/h with headlights "ON," the correction speed specifying unit 109 acquires the number of acceleration operations "4" and the number of deceleration operations "19" on the first row in FIG. 2 associated with the combination.

If the number of acceleration operations and the number of deceleration operations cannot be acquired (NO in S105), the correction speed specifying unit 109 returns the process to S101.

If the number of acceleration operations and the number of deceleration operations are acquired (YES in S105), the correction speed specifying unit 109 compares the acquired number of acceleration operations with the acquired number of deceleration operations (S106) to determine which number of operations is larger (S107).

If the number of acceleration operations is larger than the number of deceleration operations, the correction speed specifying unit 109 specifies a correction speed higher than the set speed for the constant-speed travel (S108).

For example, the correction speed specifying unit 109 specifies a speed that is a certain percentage higher than the set speed for the constant-speed travel (such as a speed 10% higher than the set speed) as the correction speed.

Alternatively, the correction speed specifying unit 109 specifies a speed that is higher than the set speed for the constant-speed travel by a certain speed (such as a speed 5 km/h higher than the set speed) as the correction speed.

If the number of deceleration operations is larger than the number of acceleration operations, the correction speed specifying unit 109 specifies a correction speed lower than the set speed for the constant-speed travel (S109).

For example, the correction speed specifying unit 109 specifies a speed that is a certain percentage lower than the set speed for the constant-speed travel (such as a speed 10% lower than the set speed) as the correction speed.

Alternatively, the correction speed specifying unit 109 specifies a speed that is lower than the set speed for the constant-speed travel by a certain speed (such as a speed 5 km/h lower than the set speed) as the correction speed.

Finally, the correction speed specifying unit 109 informs the constant-speed travel control unit 108 of the correction speed specified in S108 or S109 (S110). Thereafter, the correction speed specifying unit 109 returns the process to S101.

If the number of acceleration operations and the number of deceleration operations are equal, the correction speed specifying unit 109 returns the process to S101 without specifying a correction speed.

Figure 6:
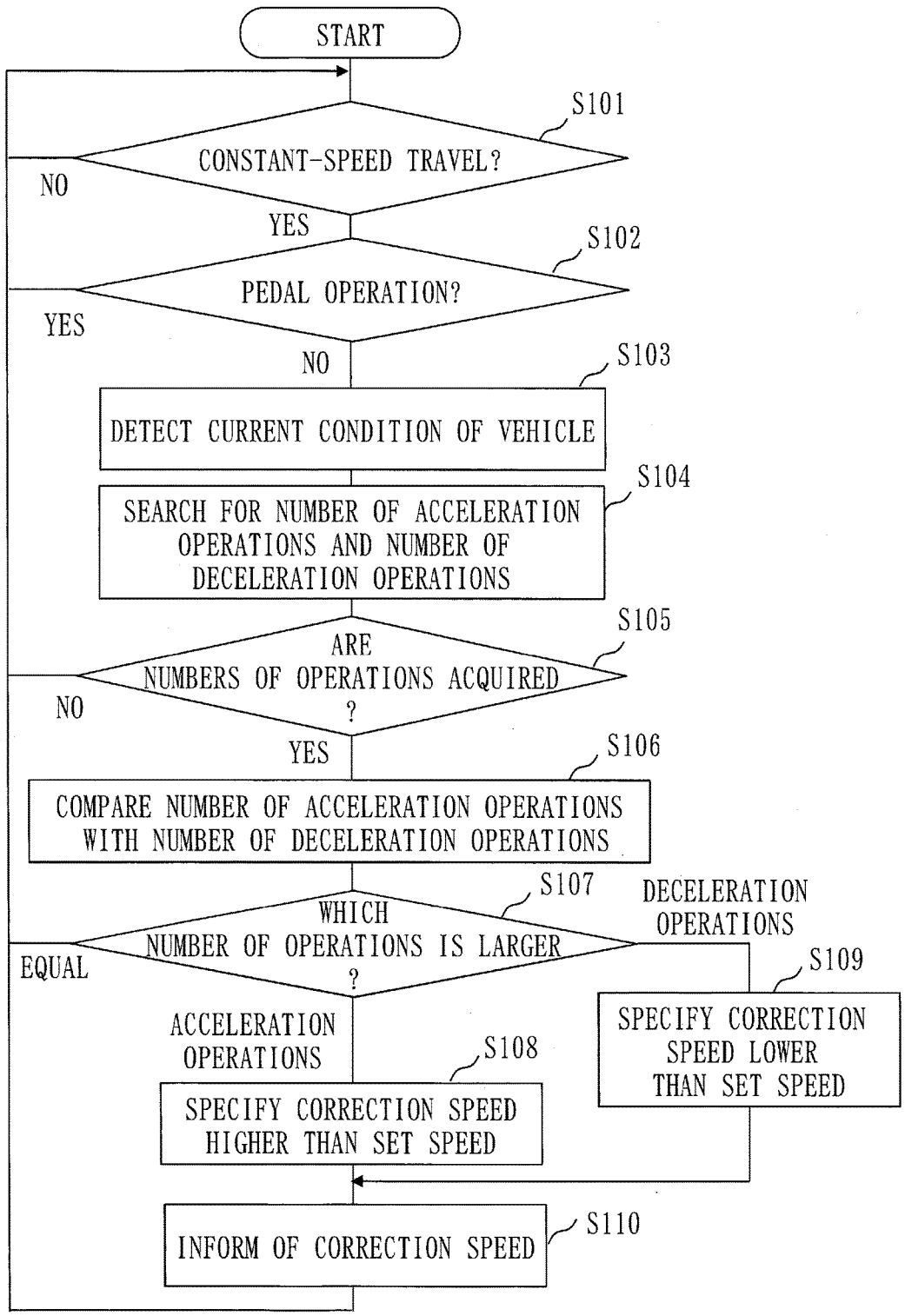
FIG. 6 is a flowchart illustrating example operations of a correction speed specifying unit according to the first embodiment.

Note that, in FIG. 6, if the number of acceleration operations is larger than the number of deceleration operations, the correction speed specifying unit 109 specifies a correction speed higher than the set speed for the constant-speed travel (S108), and if the number of deceleration operations is larger than the number of acceleration operations, the correction speed specifying unit 109 specifies a correction speed lower than the set speed for the constant-speed travel (S109).

Alternatively, the correction speed specifying unit 109 may specify a correction speed higher than the set speed only if the number of acceleration operations is larger than the number of deceleration operations and the number of acceleration operations is equal to or larger than a threshold (15 operations, for example).

Similarly, the correction speed specifying unit 109 may specify a correction speed lower than the set speed only if the number of deceleration operations is larger than the number of acceleration operations and the number of acceleration operations and the number of deceleration operations is equal to or larger than a threshold (15 operations, for example).

Alternatively, the correction speed specifying unit 109 may specify a correction speed higher than the set speed only if the number of acceleration operations is larger than the number of deceleration operations and the difference between the number of acceleration operations and the number of deceleration operations is equal to or larger than a threshold (5 operations, for example).

Similarly, the correction speed specifying unit 109 may specify a correction speed lower than the set speed only if the number of deceleration operations is larger than the number of acceleration operations and the difference between the number of deceleration operations and the number of acceleration operations is equal to or larger than a threshold (5 operations, for example).

Figure 7:
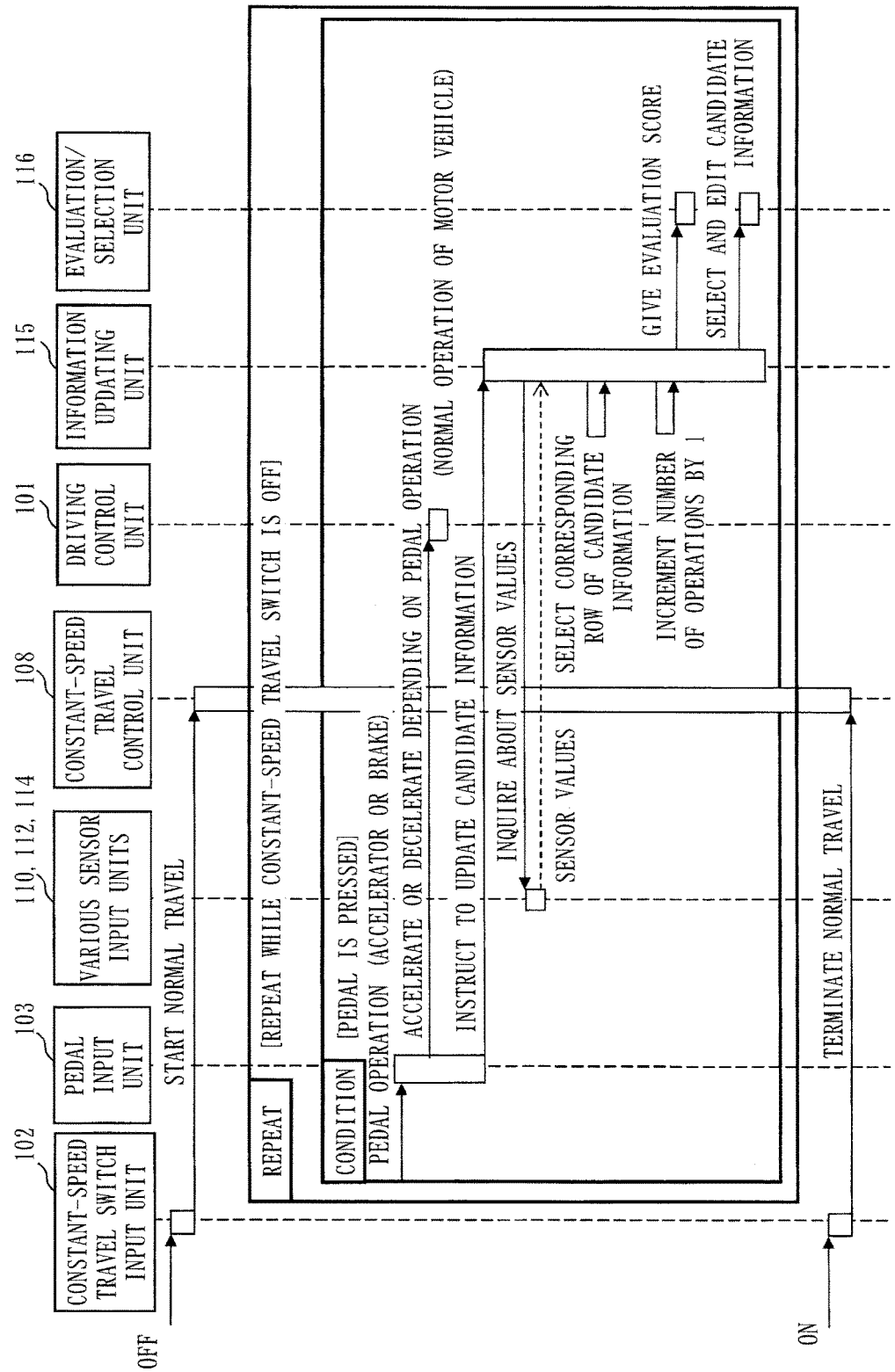
FIG. 7 is a sequence diagram illustrating example operations of the vehicle constant-speed travel control apparatus during normal travel according to the first embodiment.

Next, example operations of the vehicle constant-speed travel control apparatus 100 according to the present embodiment during the normal traveling will be explained with reference to FIG. 7.

When the pedal input unit 103 detects a pedal operation during normal traveling of the vehicle, the driving control unit 101 controls acceleration or deceleration depending on the pedal operation.

The pedal input unit 103 also informs the information updating unit 115 of the type (accelerator pedal or brake pedal) of the pedal operated by the driver, and instructs the information updating unit 115 to update the candidate information.

The information updating unit 115 instructed to update the candidate information by the pedal input unit 103 inquires sensor values of the vehicle speed sensor input unit 110, the position sensor input unit 112, the light sensor input unit 114 and the like.

The information updating unit 115 then acquires the sensor values from the vehicle speed sensor input unit 110, the position sensor input unit 112, the light sensor input unit 114, and the like.

The information updating unit 115 then selects a row of candidate information associated with the combination of the acquired sensor values.

Furthermore, the information updating unit 115 increments the number of operations on the selected row.

Specifically, the information updating unit 115 increments the number of operations of the pedal informed of by the pedal input unit 103.

The information updating unit 115 performs the above processes on all the pieces of candidate information.

Specifically, when the candidate information in FIG. 3 and the candidate information in FIG. 4 are stored in the candidate information storage unit 117, the information updating unit 115 performs the above processes on the candidate information in FIG. 3 and the candidate information in FIG. 4.

The evaluation/selection unit 116 compares the type of the pedal the information updating unit 115 is informed of by the pedal input unit 103 with the number of acceleration operations and the number of deceleration operations on the row selected by the information updating unit 115.

The evaluation/selection unit 116 then gives an evaluation score to the candidate information if the number of operations (after update) corresponding to the type of the pedal the information updating unit 115 is informed of by the pedal input unit 103 is larger than the number of operations about other operation.

For example, when the type of the pedal the information updating unit 115 is informed of by the pedal input unit 103 is the brake pedal, and if the number of deceleration operations after the update on the row selected by the information updating unit 115 is larger than the number of acceleration operations, the evaluation/selection unit 116 gives an evaluation score to the candidate information.

The evaluation/selection unit 116 performs the above processes on all the pieces of candidate information.

Specifically, when the candidate information in FIG. 3 and the candidate information in FIG. 4 are stored in the candidate information storage unit 117, the evaluation/selection unit 116 performs the above processes on the candidate information in FIG. 3 and the candidate information in FIG. 4.

Note that the information updating unit 115 and the evaluation/selection unit 116 repeat the above processes during normal traveling of the vehicle until the difference in total value of the evaluation score between the pieces of candidate information exceeds a threshold.

If the difference in total value of the evaluation score between the pieces of candidate information has exceeded the threshold, the evaluation/selection unit 116 selects the candidate information with the larger total value of the evaluation score.

In addition, the evaluation/selection unit 116 deletes some measurement items included in the selected candidate information, and adjusts the number of acceleration operations and the number of deceleration operations in the selected candidate information according to the deletion of some measurement items.

The evaluation/selection unit 116 then stores the candidate information in which the adjustment of the number of acceleration operations and the number of deceleration operations have been adjusted, as the number-of-operations information in the number-of-operations information storage unit 113.

Next, example operations of the information updating unit 115 and the evaluation/selection unit 116 will be explained with reference to FIG. 8.

Figure 8:
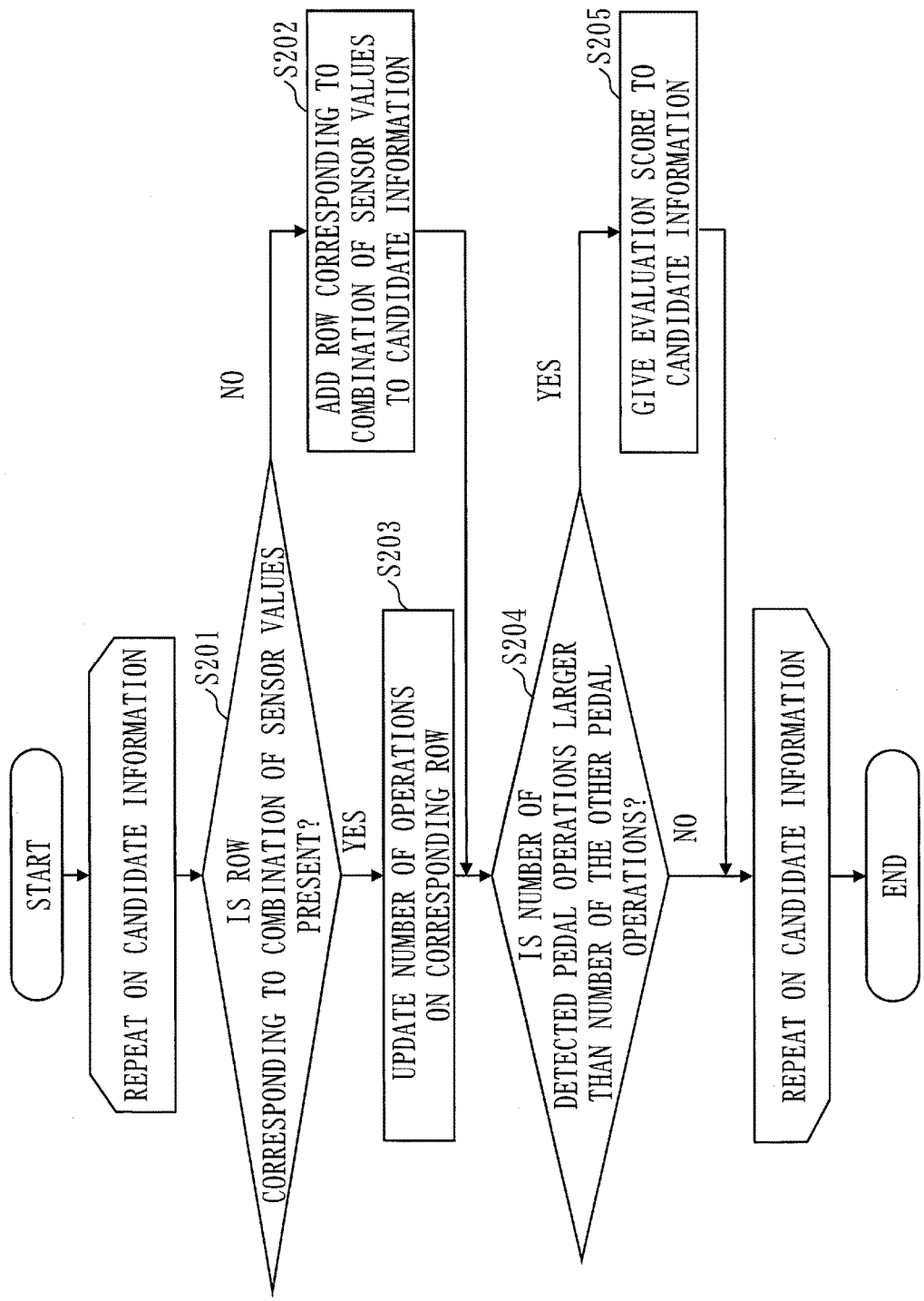
FIG. 8 is a flowchart illustrating example operations of an information updating unit and an evaluation/selection unit according to the first embodiment.

FIG. 8 illustrates an operation flow after the information updating unit 115 is informed of the pedal type by the pedal input unit 103 and further informed of sensor values from the vehicle speed sensor input unit 110, the position sensor input unit 112, the light sensor input unit 114, and the like.

First, the information updating unit 115 determines whether or not a row corresponding to the combination of the sensor values informed of by the vehicle speed sensor input unit 110, the position sensor input unit 112, the light sensor input unit 114, and the like is included in the candidate information (S201).

If no row corresponding to the combination of the sensor values is present in the candidate information, the information updating unit 115 adds a row corresponding to the combination of the sensor values to the candidate information (S202).

In addition, the information updating unit 115 updates the number of operations on the added row.

Specifically, the information updating unit 115 sets the number of operations of the pedal informed of by the pedal input unit 103 to "1."

If a row corresponding to the combination of the sensor values is present (YES in S201), the information updating unit 115 updates the update the number of corresponding operations on the row corresponding to the combination of the sensor values (S203).

Specifically, the information updating unit 115 increments the number of operations of the pedal informed of by the pedal input unit 103.

The information updating unit 115 also informs the evaluation/selection unit 116 of the value of the number of acceleration operations and the value of the number of deceleration operations on the row extracted in S201 (the row corresponding to the combination of the sensor values), and the type of pedal informed of by the pedal input unit 103.

The evaluation/selection unit 116 informed of the value of the number of acceleration operations, the value of the number of deceleration operations and the type of the pedal determines whether or not the number of pedal operations detected by the pedal input unit 103 is larger than the number of the other pedal operations (S204).

If the number of pedal operations detected by the pedal input unit 103 is larger than the number of the other pedal operations (YES in S204), the evaluation/selection unit 116 gives an evaluation score to the corresponding candidate information.

When an operation of the brake pedal is detected by the pedal input unit 103, that is, when the type of the pedal informed of by the information updating unit 115 is the brake pedal, and if the number of deceleration operations informed of by the information updating unit 115 is larger than the number of acceleration operations, the evaluation/selection unit 116 gives an evaluation score.

The evaluation/selection unit 116 is provided with an area for totalizing evaluation scores for each piece of candidate information in a storage area, for example, and increments a totalized value of the evaluation scores of the corresponding candidate information each time the determination in S204 is YES.

The information updating unit 115 and the evaluation/selection unit 116 repeat the above processes on each piece of candidate information during normal traveling of the vehicle until the difference in total value of the evaluation score between the pieces of candidate information exceeds a threshold.

Figure 9:
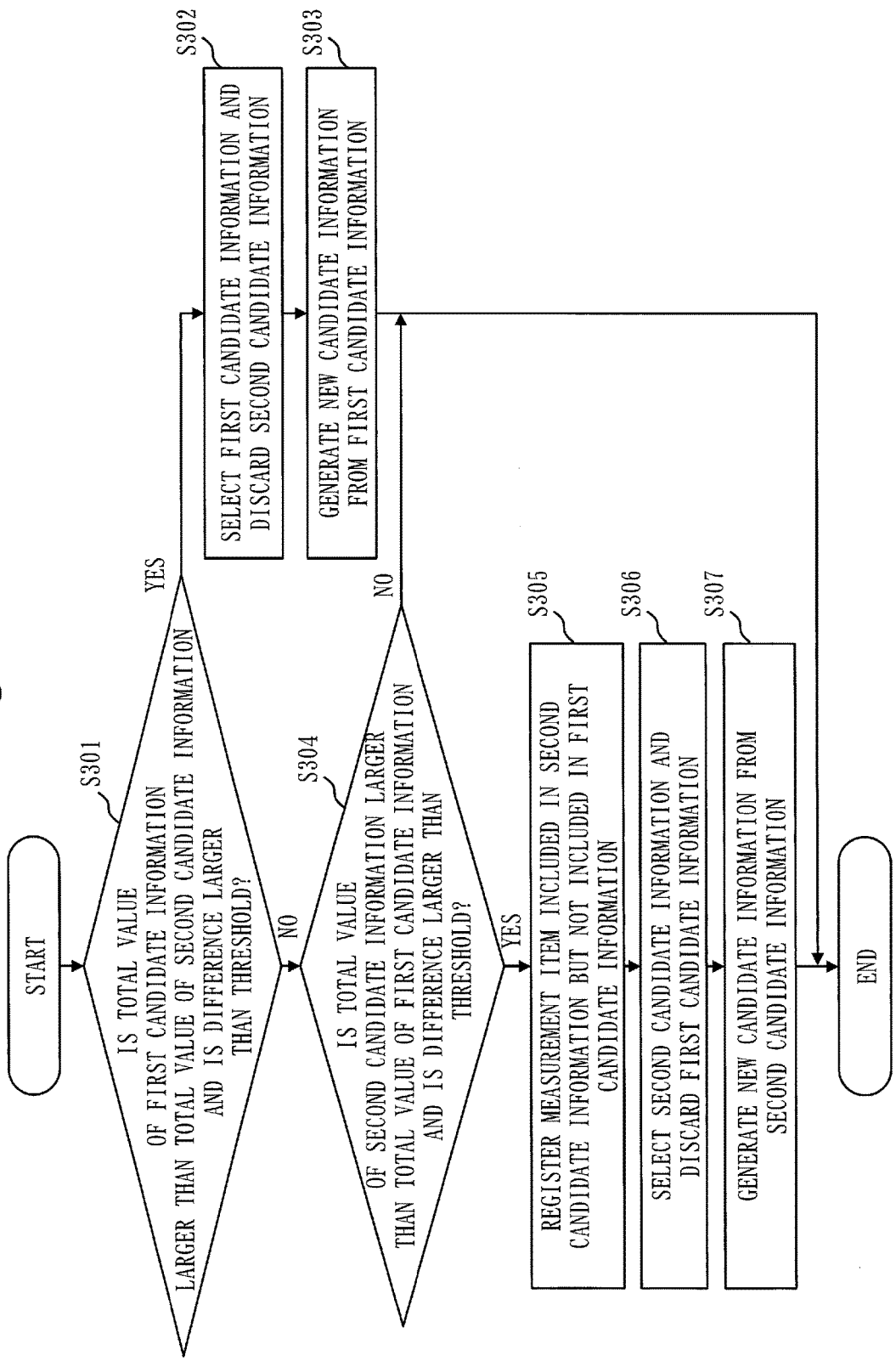
FIG. 9 is a flowchart illustrating example operation of the evaluation/selection unit according to the first embodiment.

Next, the operation of selecting candidate information performed by the information updating unit 115 will be explained with reference to FIG. 9.

If the total value of the evaluation score of first candidate information (FIG. 3) is larger than the total value of the evaluation score of second candidate information (FIG. 4) and the difference therebetween is larger than a threshold (YES in S301), the evaluation/selection unit 116 selects the first candidate information and discards the second candidate information (S302).

As a result, a measurement item that is included in the second candidate information but is not included in the first candidate information ("headlights" in the example of FIG. 4) is considered to be unnecessary, and is no longer used.

Subsequently the evaluation/selection unit 116 generates new candidate information from the first candidate information (S303).

The procedures to generate the new candidate information are as described above.

If the determination in S301 is NO, and if the total value of the evaluation score of the second candidate information is larger than the total value of the evaluation score of the first candidate information and the difference therebetween is larger than the threshold (YES in S304), the evaluation/selection unit 116 registers a measurement item that is included in the second candidate information but is not included in the first candidate information ("headlights" in the example of FIG. 4) as a measurement item that is prohibited to be deleted.

As described above, a registered measurement item will no longer be deleted when new candidate information is generated.

Alternatively, the evaluation/selection unit 116 may put on the corresponding measurement item in the second candidate information, a mark indicating the measurement item is determined.

Subsequently, the evaluation/selection unit 116 selects the second candidate information, and discards the first candidate information (S305).

The evaluation/selection unit 116 also generates new candidate information from the second candidate information (S307).

The procedures to generate the new candidate information are as described above.

Note that, if the determination in S304 is NO, the evaluation/selection unit 116 terminates the process.

\*\*\*Description of Effects of Embodiment\*\*\*

As described above, according to the present embodiment, the traveling speed of a vehicle can be corrected on the basis of estimation on whether acceleration is required or deceleration is required depending on the current condition of the vehicle, based on number-of-operations information indicating correlation between a pedal operation of the driver and the condition of the vehicle.

Furthermore, according to the present embodiment, the improvement in the number-of-operations information allows stronger correlation between pedal operations of the driver and the condition of the vehicle to be obtained, which allows estimation on whether acceleration is required or deceleration is required with higher accuracy.

\*\*\*Description of Example Hardware Configuration\*\*\*

Finally, an example hardware configuration of the vehicle constant-speed travel control apparatus 100 will be described with reference to FIG. 10.

The vehicle constant-speed travel control apparatus 100 is a computer.

The vehicle constant-speed travel control apparatus 100 includes hardware components such as a processor 901, an auxiliary storage device 902, a memory 903, a communication device 904, an input interface 905, and a display interface 906.

The processor 901 is connected to other hardware components via a signal line 910, and controls these hardware components.

The input interface 905 is connected to an input device 907.

The display interface 906 is connected to a display 908.

The processor 901 is an IC (Integrated Circuit) to perform processing.

The processor 901 is a CPU (Central Processing Unit), a DSP (Digital Signal Processor), or a GPU (Graphics Processing Unit), for example.

The auxiliary storage device 902 is a ROM (Read Only Memory), a flash memory, or a HDD (Hard Disk Drive), for example.

The memory 903 is a RAM (Random Access Memory), for example.

The set speed storage unit 111, the number-of-operations information storage unit 113, and the candidate information storage unit 117 illustrated in FIG. 1 are implemented by the auxiliary storage device 902 or the memory 903.

The communication device 904 includes a receiver 9041 to receive data and a transmitter 9042 to transmit data.

The communication device 904 is a communication chip or a NIC (Network Interface Card), for example.

The input interface 905 is a port to which a cable 911 of the input device 907 is connected.

The input interface 905 is a USB (Universal Serial Bus) terminal, for example.

The display interface 906 is a port to which a cable 912 of the display 908 is connected.

The display interface 906 is an USB terminal or an HDMI (registered trademark) (High Definition Multimedia Interface) terminal, for example.

The input device 907 is a mouse, a keyboard, or a touch panel, for example.

The display 908 is an LCD (Liquid Crystal Display), for example.

The auxiliary storage device 902 stores program to implement the functions of the driving control unit 101, the constant-speed travel switch input unit 102, the pedal input unit 103, the engine control unit 104, the clutch control unit 105, the transmission control unit 106, the brake control unit 107, the constant-speed travel control unit 108, the correction speed specifying unit 109, the vehicle speed sensor input unit 110, the set speed storage unit 111, the position sensor input unit 112, the light sensor input unit 114, the information updating unit 115, and the evaluation/selection unit 116 (which will be collectively referred to as "units") illustrated in FIG. 1.

The programs are loaded into the memory 903, read by the processor 901, and executed by the processor 901.

Furthermore, the auxiliary storage device 902 also stores an OS (Operating System).

At least part of the OS is loaded into the memory 903, and the processor 901 executes the programs to implement the functions of the "units" while executing the OS.

Figure 10:
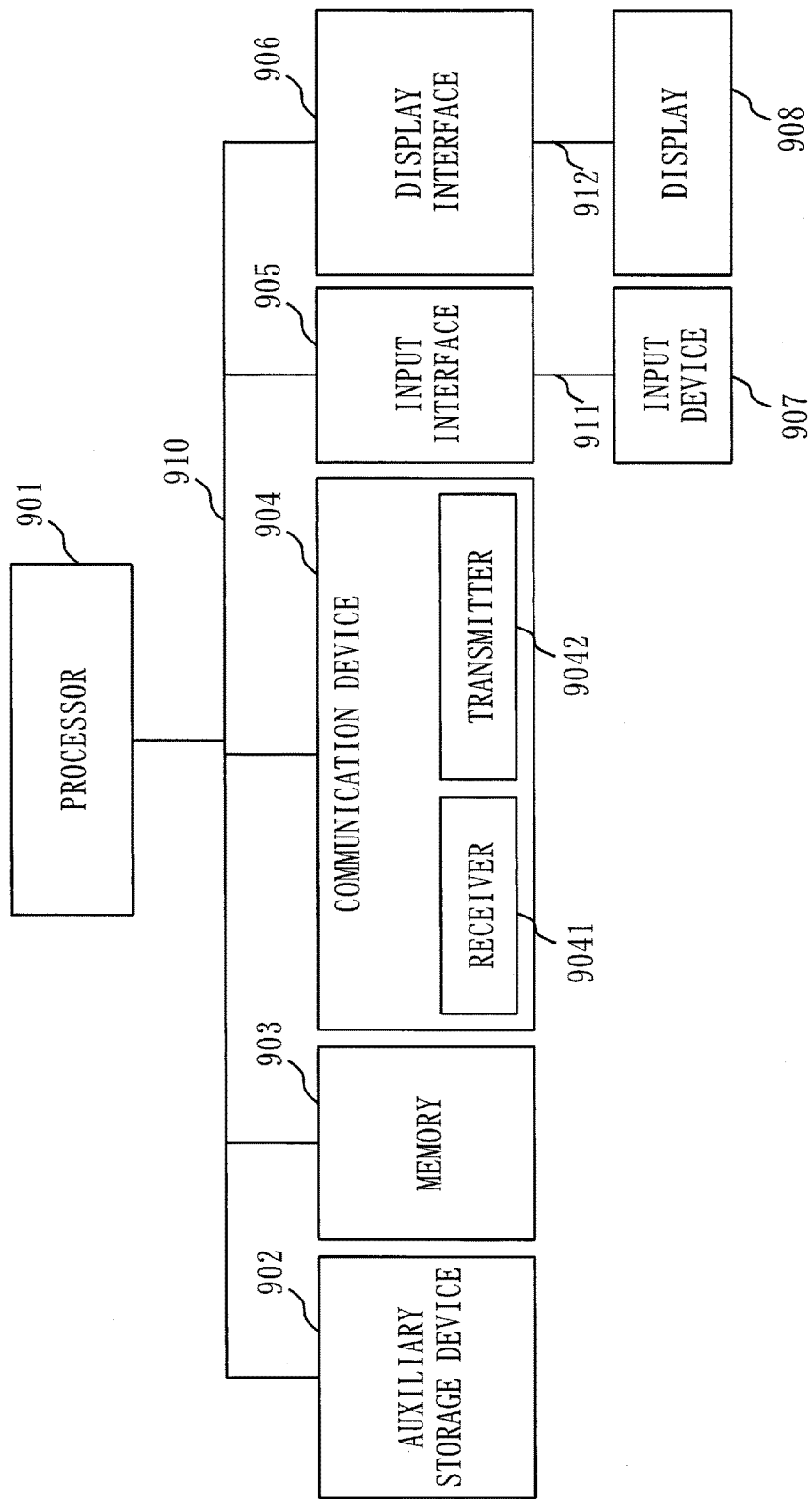
FIG. 10 is a diagram illustrating an example hardware configuration of the vehicle constant-speed travel control apparatus according to the first embodiment.

While one processor 901 is illustrated in FIG. 10, the vehicle constant-speed travel control apparatus 100 may include a plurality of processors 901.

The plurality of processors 901 may then execute the programs to implement the functions of the "units" in cooperation with one another.

Furthermore, information, data, signal values, and variable values representing results of processing performed by the "units" are stored in the memory 903, the auxiliary storage device 902, or a register or a cache memory in the processor 901.

Furthermore, the programs to implement the functions of the "units" are stored in a storage medium such as a magnetic disk, a flexible disk, an optical disk, a compact disk, a Blu-ray (registered trademark) disk, or a DVD.

The "units" may alternatively be provided in the form of "circuitry."

Alternatively, "units" may be read as "circuits", "steps", "procedures", or "processes".

The "circuit" and "circuitry" are concepts including not only the processor 901 but also other types of processing circuits such as a logic IC, a GA (Gate Array), an ASIC (Application Specific Integrated Circuit), and an FPGA (Field-Programmable Gate Array).

REFERENCE SIGNS LIST

100: vehicle constant-speed travel control apparatus, 101: driving control unit, 102: constant-speed travel switch input unit, 103: pedal input unit, 104: engine control unit, 105: clutch control unit, 106: transmission control unit, 107: brake control unit, 108: constant-speed travel control unit, 109: correction speed specifying unit, 110: vehicle speed sensor input unit, 111: set speed storage unit, 112: position sensor input unit, 113: number-of-operations information storage unit, 114: light sensor input unit, 115: information updating unit, 116: evaluation/selection unit, 117: candidate information storage unit.

The invention claimed is:

1. A vehicle constant-speed travel control apparatus comprising:
processing circuitry to:
store number-of-operations information in which a plurality of conditions of the vehicle is defined and number of acceleration operations and number of deceleration operations performed by the vehicle are described for each condition defined;
detect a current condition of the vehicle, when the vehicle travels at a constant speed, extract number of acceleration operations and number of deceleration operations described for a condition corresponding to the detected current condition of the vehicle from the number-of-operations information, compare the extracted number of acceleration operations with the extracted number of deceleration operations, specify a correction speed higher than a set speed for a constant-speed travel if the number of acceleration operations is larger than the number of deceleration operations, and specify a correction speed lower than the set speed if the number of deceleration operations is larger than the number of acceleration operations; and
make the vehicle travel at a constant speed based on the correction speed specified.

2. The vehicle constant-speed travel control apparatus according to claim 1, wherein
the processing circuitry specifies a correction speed higher than the set speed, if the number of acceleration operations is larger than the number of deceleration operations and the number of acceleration operations is equal to or larger than a threshold, and
specifies a correction speed lower than the set speed, if the number of deceleration operations is larger than the number of acceleration operations and the number of deceleration operations is equal to or larger than a threshold.

3. The vehicle constant-speed travel control apparatus according to claim 1, wherein
the processing circuitry specifies a correction speed higher than the set speed, if the number of acceleration operations is larger than the number of deceleration operations, and a difference between the number of acceleration operations and the number of deceleration operations is equal to or larger than a threshold, and
specifies a correction speed lower than the set speed, if the number of deceleration operations is larger than the number of acceleration operations and a difference between the number of deceleration operations and the number of acceleration operations is equal to or larger than a threshold.

4. The vehicle constant-speed travel control apparatus according to claim 1, wherein
the processing circuitry stores number-of-operations information in which a plurality of measurement items is included, conditions of the vehicle are defined by combinations of measured values of the plurality of measurement items, and the number of acceleration operations and the number of deceleration operations performed by the vehicle are described for each combination of the measured values of the plurality of measurement items, and
acquires, when the vehicle travels at a constant speed, a current measured value for each measurement item included in the number-of-operations information, and extracts from the number-of-operations information, the number of acceleration operations and the number of deceleration operations described for a combination of measured values corresponding to a combination of the acquired current measured values.

5. The vehicle constant-speed travel control apparatus according to claim 4, wherein
the processing circuitry evaluates a plurality of pieces of number-of-operations information whose combinations of measurement items are different from each other,
selects a piece of number-of-operations information from the plurality of pieces of number-of-operations information according to an evaluation result,
stores the number-of-operations information selected, and
extracts the number of acceleration operations and the number of deceleration operations from the number-of-operations information stored.

6. The vehicle constant-speed travel control apparatus according to claim 5, wherein
the processing circuitry acquires a current measured value for each measurement item included in the plurality of pieces of number-of-operations information each time either of an acceleration operation or a deceleration operation is detected from the vehicle when the vehicle performs a normal travel which is not the constant-speed travel, and updates in each of the plurality of pieces of number-of-operations information, the number of operations about an operation detected, out of the number of acceleration operations and the number of deceleration operations being described for a combination of measured values corresponding to a combination of the acquired current measured values,
gives an evaluation score to a piece of number-of-operations information, in the plurality of pieces of number-of-operations information, in which the number of operations about the operation detected after update out of the number of acceleration operations and the number of deceleration operations is larger than the number of operations about other operation, and
selects a piece of number-of-operations information from the plurality of pieces of number-of-operations information based on total values of the evaluation score of the respective pieces of number-of-operations information.

7. The vehicle constant-speed travel control apparatus according to claim 4, wherein
the processing circuitry evaluates a plurality of pieces of number-of-operations information whose combinations of measurement items are different from each other,
selects a piece of number-of-operations information from the plurality of pieces of number-of-operations information according to an evaluation result and edits the selected number-of-operations information to generate new number-of-operations information, and
evaluates the number-of-operations information selected and the new number-of-operations information generated.

8. The vehicle constant-speed travel control apparatus according to claim 7, wherein
the processing circuitry acquires a current measured value for each measurement item included in the plurality of pieces of number-of-operations information each time either of an acceleration operation or a deceleration operation is detected from the vehicle when the vehicle performs a normal travel which is not the constant-speed travel, and updates in each of the plurality of pieces of number-of-operations information, the number of operations about an operation detected, out of the number of acceleration operations and the number of deceleration operations being described for a combination of measured values corresponding to a combination of the acquired current measured values, gives an evaluation score to a piece of number-of-operations information, in the plurality of pieces of number-of-operations information, in which the number of operations about the operation detected after update out of the number of acceleration operations and the number of deceleration operations is larger than the number of operations about other operation, and selects a piece of number-of-operations information from the plurality of pieces of number-of-operations information based on total values of the evaluation score of the respective pieces of number-of-operations information.

9. The vehicle constant-speed travel control apparatus according to claim 7, wherein the processing circuitry deletes a part of measurement items included in the selected number-of-operations information to generate new number-of-operations information.

10. The vehicle constant-speed travel control apparatus according to claim 9, wherein the processing circuitry evaluates first number-of-operations information in which n (n is an integer of 2 or greater) measurement items are included, and second number-of-operations information in which n measurement items in common with the first number-of-operations information are included and m (m is an integer of 1 or greater) measurement items not in common with the first operation information are included, deletes an item being a part of the n measurement items in the first number-of-operations information to generate new number-of-operations information, when the the processing circuitry selects the first number-of-operations information based on an evaluation result from the the processing circuitry, and deletes a measurement item being a part of the n measurement items in the second number-of-operations information to generate new number-of-operations information, when the the processing circuitry selects the second number-of-operations information based on an evaluation result .

11. The vehicle constant-speed travel control apparatus according to claim 10, wherein the processing circuitry registers the m measurement items as measurement items prohibited to be deleted, when the processing circuitryt selects the second number-of-operations information based on an evaluation result from the processing circuitry.

12. A vehicle constant-speed travel control method by a computer storing number-of-operations information in which a plurality of conditions of the vehicle is defined and number of acceleration operations and number of deceleration operations performed by the vehicle are described for each condition defined, the method comprising:

detecting a current condition of the vehicle, when the vehicle travels at a constant speed, extracting number of acceleration operations and number of deceleration operations described for a condition corresponding to the detected current condition of the vehicle from the number-of-operations information, comparing the extracted number of acceleration operations with the extracted number of deceleration operations, specifying a correction speed higher than a set speed for a constant-speed travel if the number of acceleration operations is larger than the number of deceleration operations, and specifying a correction speed lower than the set speed if the number of deceleration operations is larger than the number of acceleration operations; and making the vehicle travel at a constant speed based on the specified correction speed.

13. A non-transitory computer readable medium storing a vehicle constant-speed travel control program to cause, a computer storing number-of-operations information in which a plurality of conditions of the vehicle is defined and number of acceleration operations and number of deceleration operations performed by the vehicle are described for each condition defined, to execute:

a correction speed specifying process of detecting a current condition of the vehicle, when the vehicle travels at a constant speed, extracting number of acceleration operations and number of deceleration operations described for a condition corresponding to the detected current condition of the vehicle from the number-of-operations information, comparing the extracted number of acceleration operations with the extracted number of deceleration operations, specifying a correction speed higher than a set speed for a constant-speed travel if the number of acceleration operations is larger than the number of deceleration operations, and specifying a correction speed lower than the set speed if the number of deceleration operations is larger than the number of acceleration operations; and a constant-speed travel control process of making the vehicle travel at a constant speed based on the correction speed specified in the correction speed specifying process.

* * * * *